Figure 5:
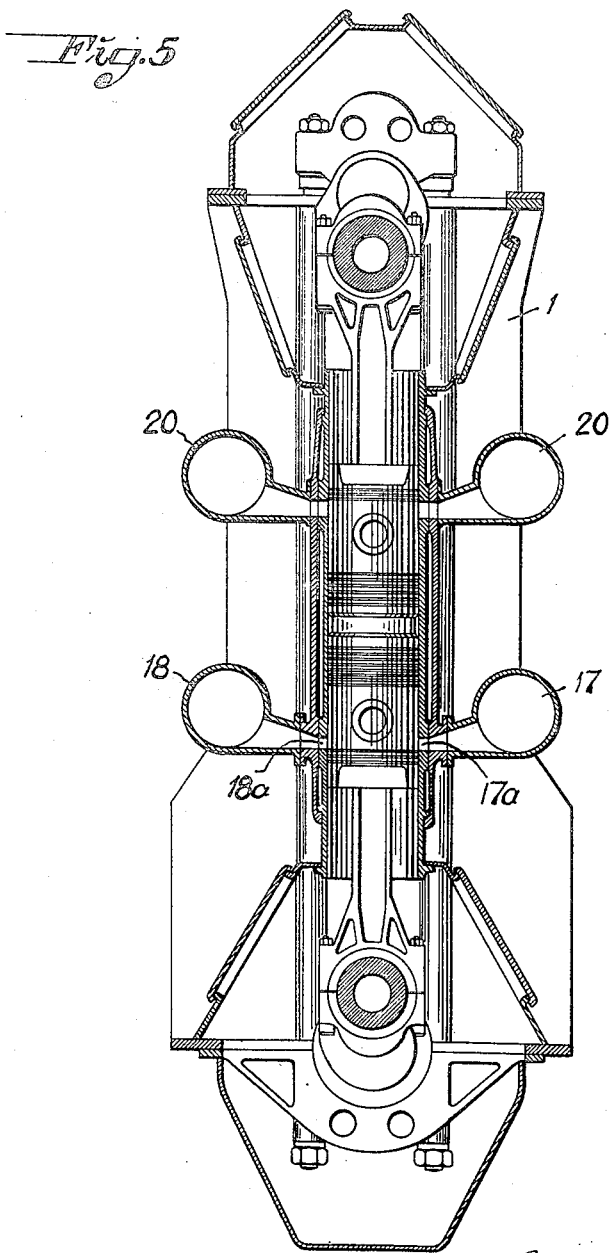

April 10, 1951     J. E. JOHANSSON     2,548,609
COMPRESSOR ARRANGEMENT FOR INTERNAL-COMBUSTION ENGINE
EXHAUSTING COMBUSTION PRODUCTS TO ANOTHER ENGINE
Filed Sept. 29, 1944     3 Sheets-Sheet 1
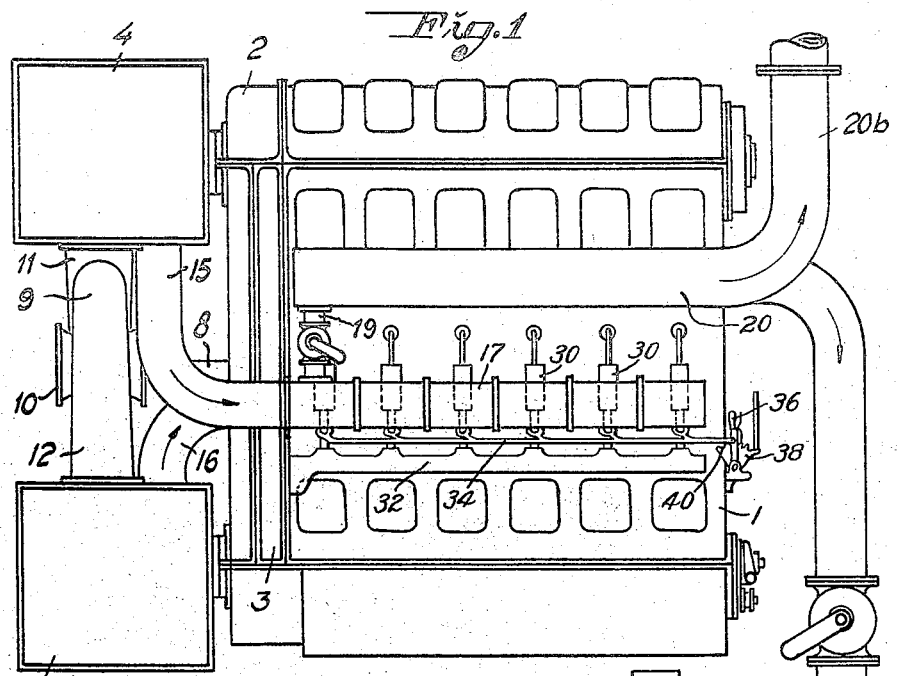
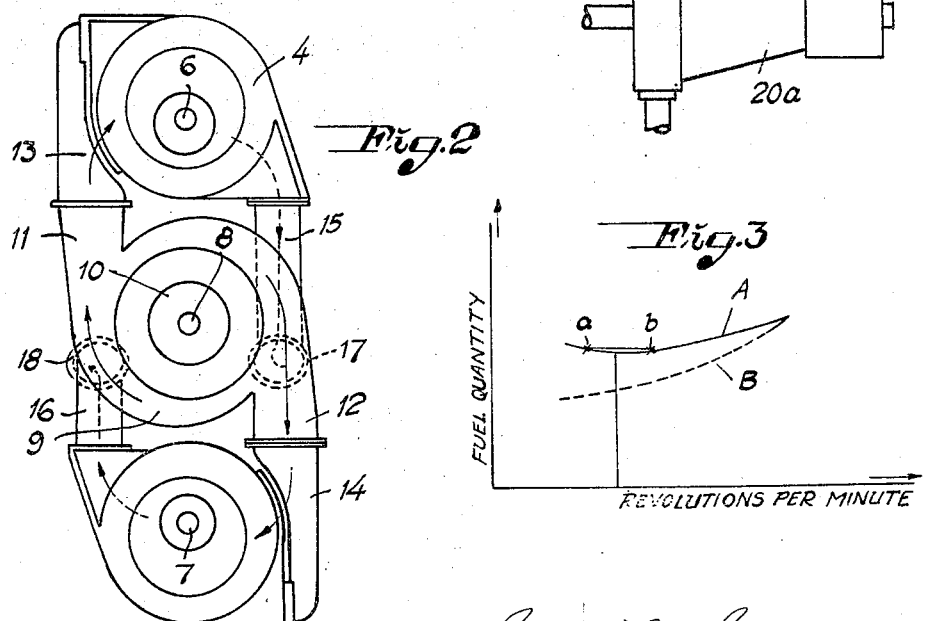

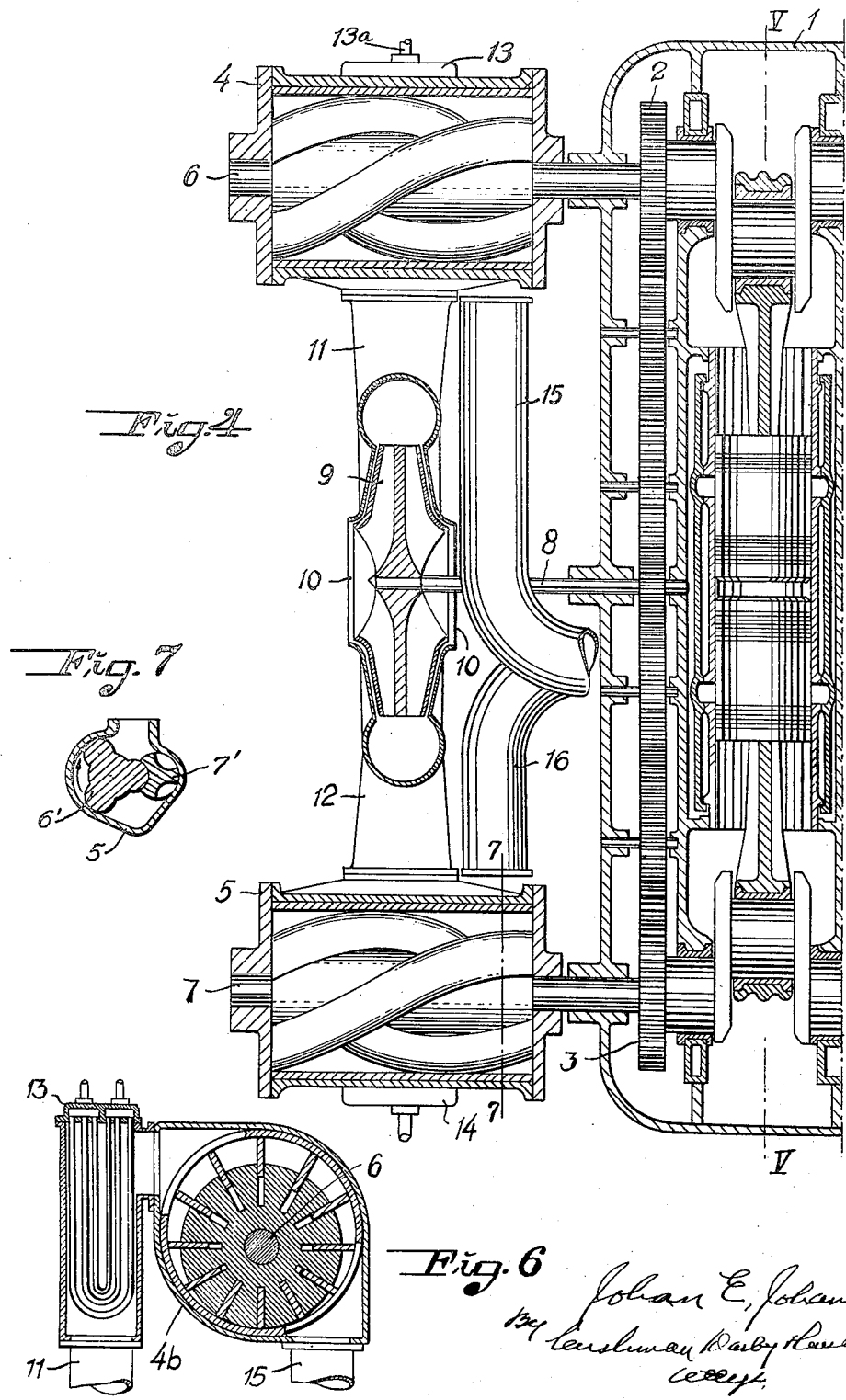

UNITED STATES PATENT OFFICE 2,548,609

COMPRESSOR ARRANGEMENT FOR INTERNAL-COMBUSTION ENGINE EXHAUSTING COMBUSTION PRODUCTS TO ANOTHER ENGINE

Johan Erik Johansson, Goteborg, Sweden, assignor to Aktiebolaget Gotaverken, Goteborg, Sweden, a corporation of Sweden Application September 29, 1944, Serial No. 556,432
In Sweden November 20, 1943

1 Claim. (Cl. 60—13)

The present invention relates to pressure gas producing plants of the type consisting of one or more internal combustion engines and an air compressor aggregate driven by said engine and in which the air compressed in said aggregate together with exhaust gases not finally expanded in the internal combustion engine constitutes the pressure gas generated by the pressure gas producer. In pressure gas producers of the type indicated, the mode of operation of the compressor aggregate is of great importance for a perfect operation of the plant. It has been proposed to effect the compression of the air by means of what may be termed displacement compressors, that is, compressors which for each cycle are supplying a constant quantity of air at a pressure independent of the number of revolutions. Compressors of this type may, however, prove unsatisfactory. If the air quantity is linearly proportional to the number of revolutions, and if the fuel for the internal combustion engine is controlled such as to obtain a constant pressure of the pressure gas supplied, the fuel consumption, as a function of the number of revolutions, will be represented by a rather flat curve. The course of this curve will become such that within a certain range the number of revolutions is likely to be different for a given quantity of fuel injected. Consequently, it may occur that the various engines in a group belonging to a large plant will run at different speeds or that the number of revolutions will suddenly change in one of the engines in spite of equal or constant fuel supply.

The other existing type of air compressors represented by centrifugal or axial dynamic compressors is per se not at all suitable for the purpose in question, since in such a compressor, it is not possible to maintain a certain pressure at varying speeds.

The invention has for its object to avoid the inconveniences adherent to both of the above named compressor types when used in a pressure gas producing plant.

In the annexed drawing there is illustrated an embodiment of the invention.

Fig. 1 is a diagrammatic side elevation of an embodiment of the pressure gas producer. Fig. 2 is a diagrammatic end elevation of the compressor aggregate. Fig. 3 is a diagram. Figure 4 illustrates on an enlarged scale a vertical section of the left hand part of Figure 1. Figure 5 is a section taken on the line V—V in Figure 4. Figure 6 is a detail sectional view of a part of the invention, and Figure 7 is a sectional view taken substantially along the line 7—7 of Figure 1.

1 indicates a multi-cylinder two-stroke internal combustion engine of the dual shaft opposed piston type. The two engine shafts are connected with each other such as by means of gear transmissions 2 and 3 and are adapted to drive rotary positive displacement compressors 4 and 5, respectively, the shafts of which are indicated at 6 and 7, respectively. Each of the shafts 6 and 7 carries a pair of oppositely rotating elements or blades 6' and 7'. By means of the gear transmission, there is further driven a shaft 8 of a centrifugal dynamic compressor 9 having an air inlet at 10. The centrifugal compressor, which constitutes the first pressure stage of the compressor aggregate supplies air to both of the displacement compressors through conduits 11 and 12, respectively. In these conduits, there are inserted coolers 13 and 14, respectively, of suitable construction, for instance of the type shown in Fig. 6, in which the air is cooled by means of water flowing through tubes 13a.

In the displacement compressors 4, 5 which constitute the second pressure stage, the air is given a pressure which substantially corresponds to the pressure of the pressure gas generated by the pressure gas producer. The air discharged from the compressors 4 and 5 through the outlet conduits 15 and 16, respectively, passes through distributing chambers 17 and 18, respectively, arranged on either side of the engine 1 and is supplied to the air inlet ports 17a, 18a of the engine to be used as scavenging and combustion air. The gases produced by the combustion in the engine cylinders are not finally expanded and are discharged through the conduits 20 to the place of consumption, such as a gas turbine diagrammatically indicated at 20a. Advantageously, all of the air produced in the air compressors is passed through the engine cylinders. Instead thereof, part of the air may, by means of a valve-controlled bypass conduit 19, directly be supplied into the pressure gas conduit 20, into the turbine 20a or to another place of consumption, such as through a conduit 20b.

Due to the fact that the centrifugal or axial dynamic compressor is located in the space between the two displacement compressors, the available space is utilized in the best possible way. For instance, in marine engine plants, the space in the longitudinal direction should be utilized as far as possible and, consequently, it is advantageous to use two minor displacement compressors rather than a single large compressor. The dimensions of the displacement compressors are further reduced due to the pressure stage arranged in series before the displacement compressors.

On account of this combination of compressors, the space required may be reduced as compared with a compressor aggregate consisting of displacement compressors only, and more advantageous controlling conditions of the plant are obtained. In the first pressure stage, the pressure is dependent upon the speed of the engine. The total air quantity generated will be reduced more rapidly than the speed of the engine, since in the second stage the compressor will work at reduced initial pressure as well as reduced speed. The maximum load will correspond to the maximum speed exclusively. At lower speeds, the average pressure will be lower. If the fuel is controlled such as to obtain a constant pressure of the pressure gas produced in the plant, the curve representing the fuel consumption as a function of the number of revolutions will be more inclined than in compressor aggregates consisting of displacement compressors only, and, consequently, the control will not cause any difficulties.

The engine is provided with suitable fuel pumps 30, for instance of the well-known Bosch-type having rotatable pistons for the control of the fuel quantity. The pumps are actuated, in the usual manner, by means of a cam shaft enclosed in a casing 32. To control the amount of fuel, the pistons of the pumps are actuated by a common rod 34 connected to a control lever 36 which engages a toothed segment 38. The segment 38 is pivoted at 40 to a fixed base.

Although the displacement compressor may consist of any suitable piston compressor it is very advantageous to have the displacement compressor devised as a rotary compressor, such as a screw compressor, shown in Fig. 4, Root's blower, gear driven compressor or the like. In this way, inconveniences are avoided which might arise due to the great number of valves provided in piston compressors.

In the diagram according to Fig. 3, which represents the fuel consumption as a function of the number of revolutions per minute of the engine, A indicates the curve obtained in a plant including displacement compressors exclusively and in which the fuel is controlled such as to obtain a constant pressure of the gas generated in the pressure gas producer. As will be seen, the curve A becomes rather flat. Consequently, it may occur that at a given fuel consumption the number of revolutions will oscillate between the values $a$ and $b$, as exemplified in the drawing, with the result that the speed of the engine may obtain uncontrollable high values. By combining the displacement compressor, in accordance with the invention, with a dynamic compressor which is arranged in series before the displacement compressor and works at a pressure of supply dependent upon the speed of the engine, the corresponding curve will have an inclined course as indicated at B, and each quantity of fuel consumption will correspond to a definite number of revolutions.

What I claim is:

A pressure gas power plant comprising an internal combustion engine of the opposed piston type and having a pair of spaced engine shafts, means operatively connecting said shafts to each other and to a driven shaft, a positive displacement rotary air compressor connected to each engine shaft so as to be driven thereby, a dynamic air compressor between the rotary compressors and connected to said driven shaft, means for supplying air from said dynamic air compressor to said displacement compressors, said displacement compressors having air discharge outlets, said engine on opposite sides thereof having distributing chambers communicating with said discharge outlets, a second engine separated from said internal combustion engine, means for supplying exhaust gases not finally expanded in said internal combustion engine to said second engine, and means for controlling the supply of fuel to said internal combustion engine to maintain substantially constant the pressure of said exhaust gases.

JOHAN ERIK JOHANSSON.

REFERENCES CITED

The following references are of record in the file of this patent:

UNITED STATES PATENTS

| Number | Name | Date |
|---|---|---|
| 933,906 | Iliy | Sept. 14, 1909 |
| 1,825,525 | Johansson | Sept. 29, 1931 |
| 2,201,682 | Johansson | May 21, 1940 |
| 2,281,821 | Balmer | May 5, 1942 |
| 2,293,548 | Johansson | Aug. 18, 1942 |
| 2,296,268 | Büchi | Sept. 22, 1942 |

FOREIGN PATENTS

| Number | Country | Date |
|---|---|---|
| 142,051 | Great Britain | Apr. 29, 1920 |